Nov. 17, 1964   J. RABINOW   3,157,101
CAMERA WITH VACUUM HOLDER FOR FILM
Filed Feb. 23, 1962

INVENTOR
Jacob Rabinow
BY Joseph A. Genovese &
Max L. Libman
ATTORNEYS

United States Patent Office 3,157,101
Patented Nov. 17, 1964

3,157,101
CAMERA WITH VACUUM HOLDER FOR FILM
Jacob Rabinow, Takoma Park, Md., assignor, by mesne assignments, to Control Data Corporation, Minneapolis, Minn., a corporation of Minnesota
Filed Feb. 23, 1962, Ser. No. 175,052
5 Claims. (Cl. 95—31)

This invention relates to photographic cameras and particularly to cameras which use roll film.

Sometimes, difficulties are encountered in holding photographic film flat in the focal or exposure plane of a camera while an exposure is being made. This is especially true in cameras using large, flexible film. A number of flattening devices have been suggested, but none has been completely satisfactory. For example, the Rockstroh Patent No. 1,443,433 discloses a vacuum platen to hold the film flat in the exposure plane of a camera. Later, the Weiss Patent No. 2,788,724 disclosed a similar vacuum platen which is energized for a relatively short interval just before and during exposure. Thus, the vacuum platen function will not interfere with the advancing of the film after an exposure.

Two trends in modern cameras accentuate the need for extreme flatness of film. They are "fast" lenses with large apertures and very little depth of field at the film plane; and the large films such as the 70 mm. film used in still as well as motion picture cameras.

My present invention uses a vacuum platen in a way which is quite similar to Weiss in that the vacuum is applied to the platen slightly before and during the time of exposure. However, an important feature of my invention is that the shutter of my camera will not operate unless the film is actually flat against the platen. Even though prior systems use vacuum platens and indeed, Weiss has the vacuum operation interlocked with the shutter of his camera, it is entirely possible that the vacuum platen will not be effective to hold the film absolutely flat, and one or more portions of the film will be out of focus. A major distinction between my invention and prior inventions such as exemplified by Weiss, is that the actuation of the shutter of my camera is directly dependent upon perfect flatness of the entire area of the film at the exposure plane of the camera. If, for some reason the vacuum platen does not completely serve its purpose, the shutter of my camera will not operate, whereas in prior cameras equipped with vacuum platens, and under the same set of circumstances, the shutter will actuate.

Accordingly, an object of my invention is to provide a camera with means to hold the film flat at the exposure plane of the camera at the time of exposure, and if these means fail to do this, the film will not be exposed. Thereafter, the photographer has the choice of again actuating the camera, or very slightly adjusting the position of the film and then actuating the camera; or advancing the film to the next position and again actuating the camera. In the last choice there is no saving of film, but at least the photographer is given the opportunity of photographing a particular scene with film that he is assured is entirely in the exposure plane of the camera. The saving of film is important, but often good photography of a given scene is far more important than the cost of a single frame of a roll of film.

Another object of my invention is to provide a unique vacuum operated means to actuate the shutter of the camera, with these means coupled with additional means for assuring proper position and flatness of the film at the instant of shutter-actuation.

My vacuum platen corresponds to the vacuum platen of the prior art only in a general way. For example, the Rockstroh platen has a number of orifices at the center area, and a felt strip on the face of the platen to contact one surface of the film. The Weiss platen uses small diameter rollers at the top and bottom edges of the part of the film at the exposure plane in the camera to assure good contact along upper and lower lines on the film. My platen may be made with a planar front surface and could rely on rollers corresponding to those of Weiss. However, a more effective means of assuring a tight vacuum seal at the framing edges of the film, is to rely on a small lip or the equivalent which protrudes from the main area of the front surface of the vacuum platen. The lip contacts the film near the edges of the exposure plane in a manner to frame the film and form an initial air seal when the vacuum is applied to the flat rear surface of the film which pulls the film flat against the surface of the platen.

Therefore, another object of my invention is to provide a vacuum platen with means to assure an effective seal along edges thereof when the platen is energized to draw the film flush against the front face thereof.

Other objects and features of importance will become apparent in following the description of the illustrated forms of the invention.

Figure 1:
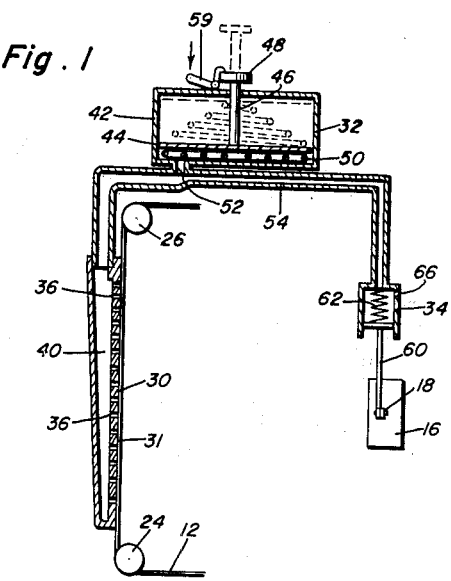
FIGURE 1 is a sectional view showing the mechanism of one form of my invention.

In the accompanying drawing the camera 10 (FIGURE 2) diagrammatically represents any conventional camera-configuration using roll film 12, although the principles of my invention can be applied to cameras using other types of film. The major problem, though, occurs in those cameras using large film in roll form. Since many types of cameras can be used, for instance the type of camera shown by Weiss, I have only schematically represented lens system 14 attached to the camera case, and the shutter mechanism 16. The kind of shutter mechanism shown is capable of being operated by moving lever 18.

Film 12 has one end attached to a take up spool 20 and the other attached to a supply spool 22, and the film passes around idler rollers 24 and 26 spaced slightly below and above the vacuum platen 30. The film transport consists of the spools, rollers, and a knob or mechanism (not shown) connected with the take up spool shaft 21.

Figure 2:
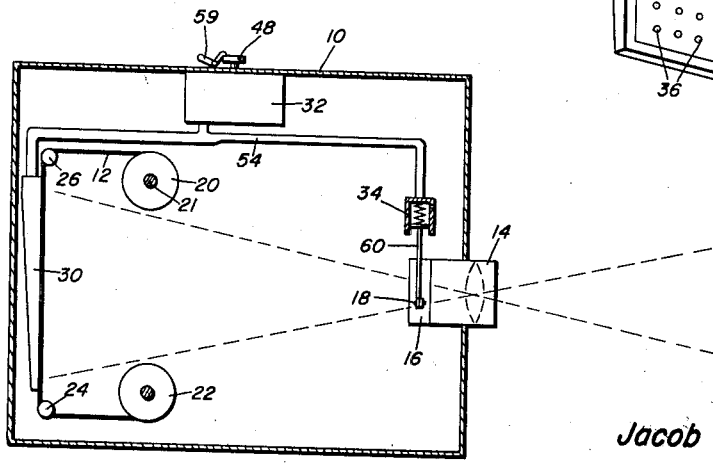
FIGURE 2 is a cross-sectional view of a camera showing the mechanism of FIGURE 1 in place.

As shown in FIGURES 1 and 2, I have a vacuum system installed in the camera case, and it includes three major components; the vacuum platen 30, a suction pump 32, and a suction-operated actuator 34 for shutter mechanism 16. Vacuum platen 30 is in the form of a flat plate 31 having a plurality of orifices 36 which communicate with a vacuum chamber 40. The vacuum chamber is defined by a plurality of walls arranged to form a receptacle whose front wall 31 contains orifices 36. The platen is secured within the camera by suitable means (not shown) and in a position so that the front surface of the front wall 31 of the platen is at the exposure plane of the camera (allowing for the thickness of the film 12). Suction pump 32 can be made in many ways, one of which is to use a closed cylinder 42 having a piston 44. The piston rod 46 extends through an opening in the top wall of the cylinder, and, for convenience, there is a push button 48 at the outer end of the piston rod. Conical spring 50 bears against the lower surface of the piston and against the bottom wall of the cylinder normally urging the piston to an elevated position (shown in dotted lines) within the cylinder. Latch 59 is connected with the camera case (FIGURE 2) or with the top wall of the cylinder (FIGURE 1) and holds the piston 44 in a normally lowered position against the opposition of spring 50. Thus, when the latch 59 is actuated, (released) the piston is freed, allowing spring 50 to quickly elevate the piston and draw a vacuum in my system through port 52 in the lower wall of cylinder 42. A conduit 54 is connected with port 52, the vacuum chamber 40 of platen 30, and to the vacuum-operated shutter actuator 34.

Actuator 34 consists of a comparatively small diameter cylinder having a piston and a light spring 62 which bears against the piston and the inner wall of the actuator 34. An orifice 66 can be provided in the cylinder wall. Orifice 66 is so small that an appreciable quantity of air cannot enter the system when the suction motor 32 is operated, but the amount of air which bleeds into the actuator 34 (through orifice 66) after shutter-actuation, is sufficient to permit the piston and the piston rod 60 to return to the position shown in FIGURE 1 after an exposure is made. Normally, the manual return of pump 32 to its initial position (shown in solid lines) will release the vacuum and reset the shutter.

The preceding operation is based on the assumption that the vacuum system will draw all of the buckled and raised parts of the film flush against the surface of the vacuum platen. If there is a film defect such as a sharp crease in the film, or if the film is misaligned in the camera, or for a not readily-understandable reason, the film does not assume a position so that the orifices 36 are closed, there will be air leakage into the system by way of the unclosed orifices 36 and chamber 40. Accordingly, the vacuum in the system will not be sufficient to operate the actuator 34. Thus, even though the photographer attempts to make an exposure, the actuator 34 will not operate shutter mechanism 16. Consequently, no light will enter the camera case and the film will not be exposed. Thereafter, the photographer can proceed as suggested previously. A device can be used to record the number of actual shutter operations so that the photographer will know definitely whether or not the shutter has actuated, but most photographers, by experience, can hear a shutter operate thereby making a special counter unnecessary. Also, an interlock can be arranged to prevent substantial motion of the film, if the shutter has not been tripped.

Figure 4:
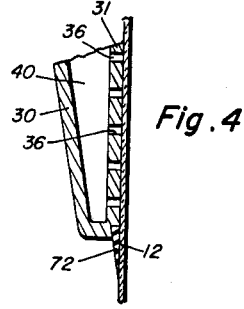
FIGURE 4 is an enlarged fragmentary sectional view showing the film pulled flush against the surface of another form of platen, and showing particularly the lip for enhancing the vacuum seal at the perimeter of the film in the exposure plane of the camera.
Figure 3:
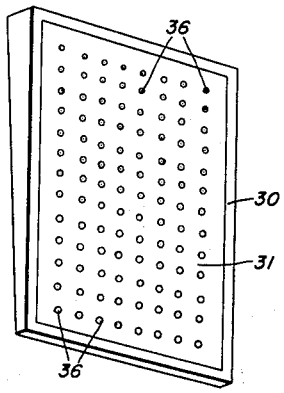
FIGURE 3 is a perspective view of one form of vacuum platen of my invention.

I previously mentioned that my platen 30 differs from previous platens of which I am aware, by framing the portion of the film at the exposure plane to enhance the vacuum seal along the perimeter of this part of the film. A lip 72 (FIGURE 4) protruding slightly forwardly from the plane of the vacuum platen is all that is required for this purpose. The lip may be made of any suitable elastomer (certain plastics, rubber, etc.).

The operation of the pneumatic system is as follows: When the photographer decides to take a picture, latch 59 is operated allowing vacuum to be drawn in the vacuum system. A rush of air will initially be drawn through the orifices 36 thereby pulling the film 12 flat against the front surface of the vacuum platen. If there are buckles or raised places in the film, they will be flattened so that the film functions as a valve by closing the orifices 36. Thus, a vacuum will be drawn in chamber 40 and conduit 54. As a result, the piston of actuator 34 will be drawn into its cylinder against the yielding opposition of light spring 62, and will cause the shutter arm 18 to be actuated. Pushing button 48 down will release the vacuum and reset the shutter actuation rod 60. If orifice 66 is provided, in a very short time after actuation of the shutter mechanism, air will bleed through the small orifice 66 in the side of the cylinder of actuator 34 and allow spring 62 to return the actuator more quickly to the position shown in FIGURE 1.

It is understood that changes, modifications and alterations may be made without departing from the protection of the following claims.

I claim:

1. An actuation system for a camera which has a shutter operator and a vacuum platen to hold the camera film flush at the instant of exposure, the improvement comprising a manually cocked vacuum source, a vacuum operated mechanical actuator connected to said shutter operator, a conduit connecting said source with said platen and with said actuator thereby requiring said platen to be closed off by said film before sufficient vacuum is developed in said conduit to actuate said shutter operator, and a manual release to trigger the cocked source which draws the vacuum in said conduit.

2. The actuation system of claim 1 and a resilient lip associated with said platen to hold the film slightly spaced from the face of said platen until suction is applied to said platen.

3. The subject matter of claim 1 wherein said vacuum source is a pump having a cavity provided with a movable wall to define an expansible chamber, a spring reacting on said wall and normally biasing said wall in one direction, and said manual release holding said wall in a first position against said spring which thereby cocks said pump.

4. In a photographic film camera having a shutter, an operator for the shutter, and means establishing an exposure plane in the camera, said means including a vacuum platen having a perforate surface against which the film is adapted to be pneumatically drawn, a manually cocked pump connected to the camera and having a casing provided with a movable wall to define an expansible chamber which is manually compressed in cocking the pump, a spring in said casing biasing said wall in the chamber-expanded direction, a mechanical suction-operated actuator connected to said shutter operator, an air conduit connecting said vacuum platen and said actuator to the expansible chamber of said pump, and a release member connected with said pump to hold said movable wall in the chamber compressed condition against the bias of said spring, said member being manually releasable to free said wall for movement by said spring to draw a vacuum in said conduit and simultaneously on said platen and said actuator by which the film is flattened against the platen urface thereby enabling said pneumatic actuator to operate the shutter of the camera.

5. The subject matter of claim 4 and a resilient lip at the edges of said platen surface, said lip forming a seal with the film along said edges of the platen.

References Cited by the Examiner

UNITED STATES PATENTS

| | | | |
|---|---|---|---|
| 2,333,835 | 11/43 | Wangerin | 95—34 |
| 2,788,724 | 4/57 | Weiss | 95—31 |
| 3,007,390 | 11/61 | Forester | 88—24 |

EVON C. BLUNK, *Primary Examiner.*